United States Patent

Griffith et al.

[15] 3,661,640
[45] May 9, 1972

[54] LOOP COOKER

[72] Inventors: Gene M. Griffith; Lester P. Hayes, both of Decatur, Ill.

[73] Assignee: A. E. Staley Manufacturing Company, Decatur, Ill.

[22] Filed: Apr. 3, 1970

[21] Appl. No.: 25,372

[52] U.S. Cl. .................................... 127/28, 127/38, 127/69
[51] Int. Cl. ........................................................ C13l 1/08
[58] Field of Search ..................... 127/28, 69, 38; 23/290.5

[56] References Cited

UNITED STATES PATENTS

| | | | |
|---|---|---|---|
| 3,485,667 | 12/1969 | Maurer | 127/28 |
| 2,730,468 | 1/1956 | Martin | 127/28 |
| 3,101,284 | 8/1963 | Etheridge | 127/28 X |

Primary Examiner—Morris O. Wolk
Assistant Examiner—Sidney Marantz
Attorney—Charles J. Meyerson

[57] ABSTRACT

A continuous cooker having a continuous closed-loop cooking chamber which maintains a constant volume of liquid phase material and a constant volume of gas phase material therein. The cooker is provided with a liquid inlet on one side of the loop, and a common gas and liquid outlet on the other side of the loop. The loop is disposed to provide a lower passageway in which a constant volume of liquid resides, and an upper passageway in which a constant volume of pressurized gas resides. The cooker automatically maintains virtually constant retained-liquid volume regardless of discharge conditions. A gas, i.e., a material which is not condensed at operating conditions is continuously added to the upper passageway.

9 Claims, 2 Drawing Figures

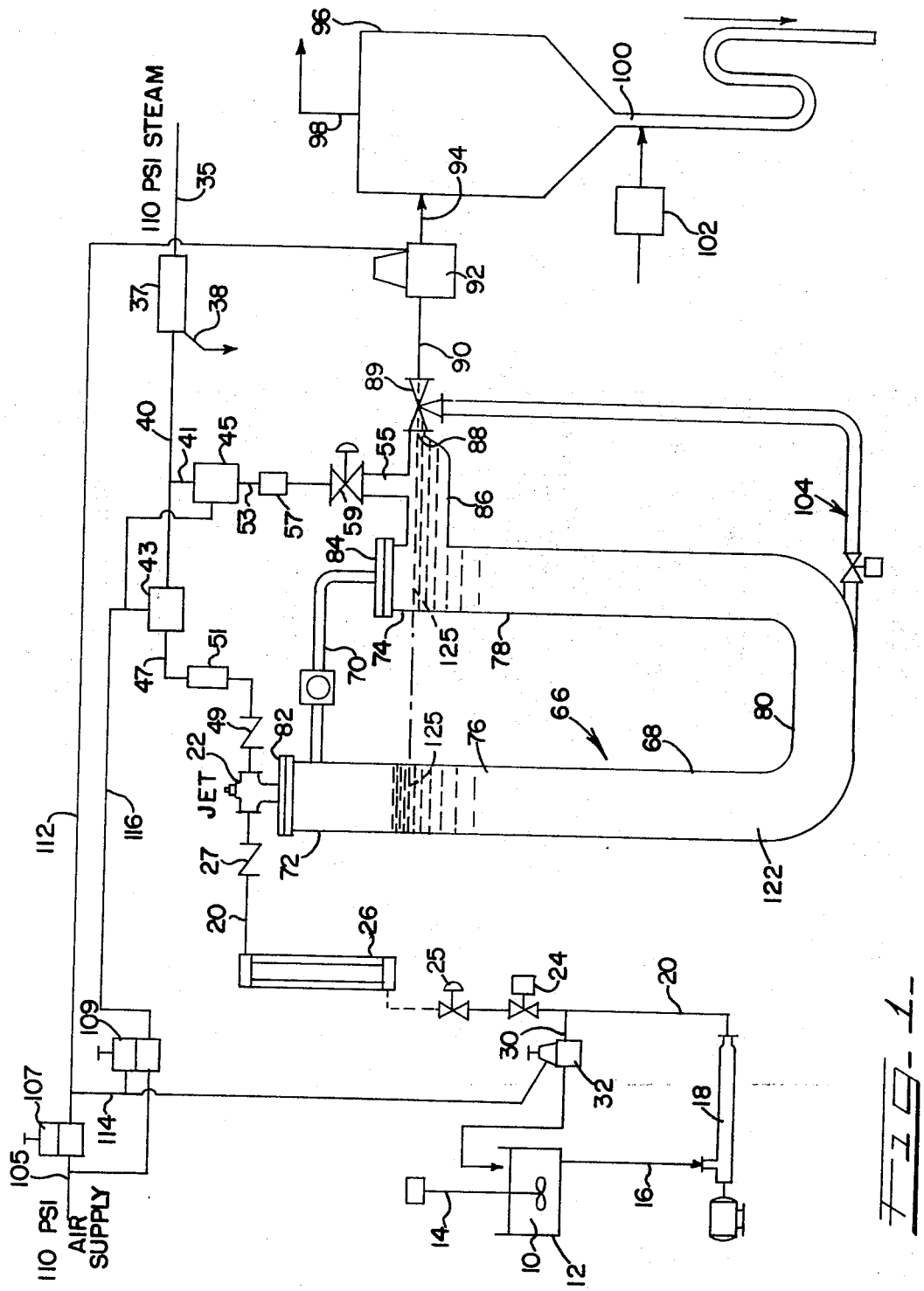

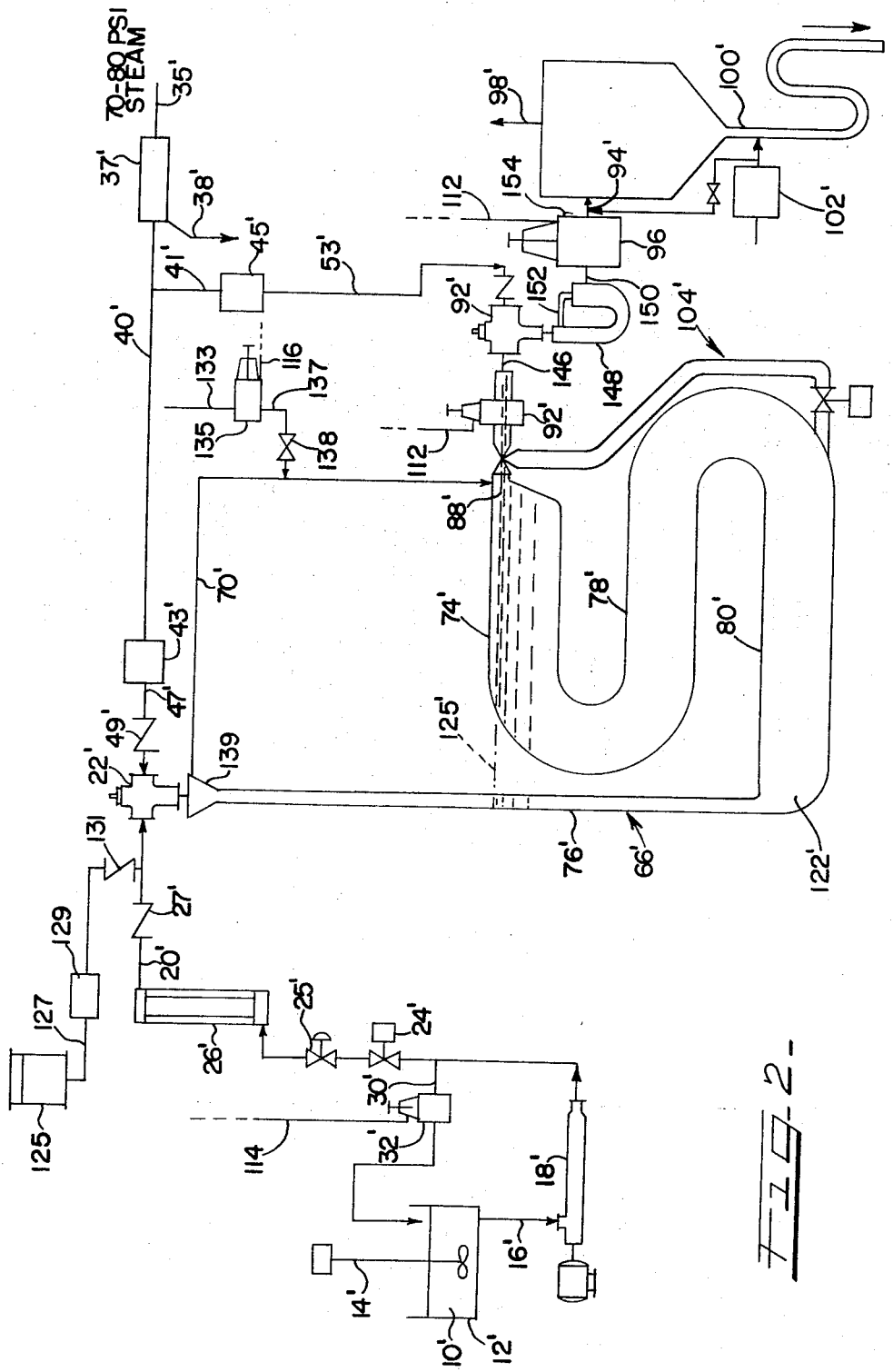

LOOP COOKER

This invention relates to improvements in the continuous heat-treating of liquid solutions and suspensions. It is particularly useful in heat treatment cycles of relatively short duration, for example those requiring less than ten minutes, in heat treatment cycles whose time-temperature conditions must be precisely controlled, and in heat treatment processes in which it is highly desirable that every increment of process liquid be substantially uniformly treated. An example of such heat treatment processes is the modification of starch in a heated aqueous slurry for the purpose of altering the chemical and/or physical characteristics of the starch. Such modification, if precisely controlled, makes the starch useful as a size or adhesive or for other purposes, e.g., in the paper making industry. It would be highly desirable to provide a relatively compact portable cooker which could be reliably operated by a relatively unsophisticated individual to convert starch slurries, for example, to low viscosity size for use in paper making.

Two kinds of phenomena take place during the cooking or "pasting" of starch. Naturally occurring starch granules undergo considerable physical change, usually "swelling" until they are completely disintegrated. Also, starch molecules, high molecular weight sugar polymers, are hydrolyzed, i.e., fragmented, into smaller structures. The number, and kind, i.e., size, of the smaller structures which are thus generated depend on the processing conditions, and are very important in determining the physical characteristics of the resulting modified "starch" material.

Several processes are currently available for the conversion of starch slurries to low viscosity materials; e.g., low temperature, (i.e., below 212° F.), conversion by chemical treatment, e.g., with acid, etc., low temperature enzymatic conversion (followed by high-temperature "killing" of enzyme), and high temperature i.e., temperatures above 212° F.) treatments with or without addition of modifying agents. Thus it would be highly desirable to provide a continuous simply operated heat-treatment apparatus which readily lends itself to the continuous heat treatment of liquids above and below the boiling point of water.

One of the most attractive of the previously proposed systems for altering the chemical and physical characteristics of starch slurries has been the low temperature enzymatic hydrolysis method.

It is customary to utilize temperatures in the 165°–190° F. range, for example, during the alpha-amylase enzymatic hydrolysis of starch molecules, e.g., at a pH of about 6.0. However, enzymes are heat-sensitive and, although highly efficacious at lower temperatures, e.g., 165°–190° F., they are inactivated or "killed" at higher temperature, e.g., 250° F. In fact, the enzymes must be inactivated, at the proper moment in order to "fix" the character of the system. Otherwise, the physical and chemical make-up will continue to change, i.e., the system will be unstable. Unstable starch slurries are of little, if any, value as size or adhesive.

At an enzyme composition level of about 0.04 percent d.s.b., starch slurry is modified to provide 55–70 seconds (147 d.s. 150° F.) Dudley viscosity after approximately 15 minutes at 180° F prior to heat treating the suspension at a temperature in the range 240°–310° F. to inactivate the enzymes. At higher enzyme concentrations, the hold-time at 180° F. can be reduced dramatically. For example, 0.12 percent d.s.b. of the same enzyme composition in the same starch slurry requires only 3 to 4 minutes to drop the viscosity to the same range, i.e., 50–70 seconds. The extent of development of the desired characteristics, e.g., viscosity, depends on enzyme concentration, temperature of treatment, time of treatment, and other variables. All of these variables need to be controlled in order to provide uniform, reliable process operation, particularly when high through-put is desired, since high through-put means shorter detention times. However, temperature has been found to be a poor operating variable by which to vary viscosity of enzymatically hydrolyzed starch slurry, whereas reaction time has proven a desirable control parameter.

Hence, it would be highly desirable to provide a continuous cooker with a constant retained volume, regardless of conditions so that with the help of constant feed pump, the retention time can be accurately controlled.

One of the most efficient methods of quickly and uniformly heating an aqueous system is the injection of live steam directly into the liquid. So-called jet mixing devices, in which thin streams of slurry are struck by a jet of live steam, are commonly used for the purpose of initially heating aqueous solutions and suspensions, and they do so uniformly. When temperatures below 200° F. are desired or required, e.g., in the enzymatic heat treatment of starch suspensions, the quantity of steam used in these jet devices is insufficient to provide an uncondensed gas phase at atmospheric pressure. However, when temperatures substantially above 212° F. are desired or required, it is highly desirable to provide at least some excess of steam, i.e., in excess of the amount required to raise the liquid phase to operating temperature, in order to virtually instantaneously heat the mass of liquid to the desired operating temperature. Such systems must be pressurized, obviously, and the amount of pressure is, of course, directly proportional to the necessary operating temperature, and is also dependent, to a lesser extent, on the chemical make-up of the aqueous system.

The provision of excess steam is believed by some to enhance the degree to which the starch granules are agitated, especially upon discharge from the cooker.

In fact, some previously suggested systems used extremely high levels of excess steam and it was reported that the drop in viscosity was directly proportional to the amount of excess steam employed. In some of the systems heretofore suggested the equipment used made it extremely difficult to standardize the time during which the liquid phase is heat-treated. In fact, in some of these systems, the quantity of excess steam affected the time during which the aqueous solution or suspension was heat treated. Moreover, some of the suggested systems required the use of immersed or partially immersed liquid-level sensing devices which controlled the cooker discharge valve. It has long been recognized that immersed operating components are a source of operating trouble. They become coated and present a real risk of malfunction.

It would be highly desirable to provide an apparatus and cooking method which can be used in conjunction with conventional jet heating mixers, which permits the use of substantial quantities of excess steam, and yet which completely separates the interdependency of the residence time or heat-treatment time and the quantity of excess steam and does so without the need for immersed liquid-level sensors.

One of the difficulties heretofore encountered in providing for readily regulated uniform products has been the difficulty encountered in regulating the heat-treatment time.

It has been suggested (U.S. Pat. No. 3,101,284), for example, that highly sensitive pressure detectors be used to sense the pressure differential between the pressure in a gas space in such a cooker, and the pressure obtained at the bottom of the liquid in the cooker, in order to determine the level of liquid in the cooker. The cooker was operated in such a way as to maintain a "constant" liquid level in the cooker. However, this involved cyclic fluctuations of the actual liquid level between the, albeit narrow, maximum and minimum levels normally encountered as a result of variations in the sensing and regulating equipment. Such sensing and level-regulating systems were necessarily complex and susceptible to maintenance problems, even though they may have provided a substantial advance in the art at the time. It would be highly desirable to provide a continuous cooker system adaptable to the use of liquid-gas streams in which the heat-treatment time for the liquid phase is substantially automatically regulated without the use of complicated liquid level controllers, liquid level sensing devices, and the like, and this is an object of this invention.

It would be highly desirable to provide an apparatus for heat-treatment of aqueous systems, e.g., solutions and aqueous suspensions, for example, for the conversion of aqueous starch slurries to low viscosity size, which permits arbitrary operator adjustment of the product quality, e.g., size viscosity, by the arbitrary operator controlled adjustment of a single operating parameter, and this is an object of an embodiment of this invention.

A major object of this invention is the provision of an improved method and apparatus for accurately and precisely controlled heat-treatment of liquid solutions and suspensions. It is a particular object of this invention to provide a continuous cooker which is readily adaptable for use at temperatures above and below the normal boiling point of water at 212° F. and which is adaptable to the heat-treatment of aqueous solutions and suspensions with, or without modifying agents such as enzymes, oxidizing agents, or the like. It is a further object of this invention to provide an apparatus for the continuous heating of aqueous solutions and suspensions mixed with gases which are non-condensable under the conditions of operation. It is a still further object of this invention to provide an apparatus which permits wide variation in the quantity of non-condensable gas used in the treatment of the solution or suspension without varying the times during which the heated liquid is subjected to the heat-treatment. It is also an object of this invention to provide a cooker which automatically, without the use of liquid level sensing and/or regulating equipment maintains a constant quantity of liquid in the heat-treatment zone, regardless of the conditions prevailing at the discharge thereof, in order to provide extremely uniform and constant control of the time during which the liquid phase is heat-treated. It is also an object of this invention to provide a cooker for heat treating the liquid, which cooker is readily adaptable to configurations providing slug flow, or non-slug flow, as desired. It is a further object of this invention to provide a cooker system which is readily adaptable to the continuous enzymatic conversion of starch. It is also an object of this invention to provide a cooker and method which readily lends itself to use in automatic startup-shutdown operation in response to an input, for example from a liquid-level sensor in a product tank into which the cooker-product is discharged.

In the drawings:

FIG. 1 is a schematic diagram illustrating a loop design cooker and associated apparatus in accordance with this invention adapted for continuous high temperature heat-treatment of starch slurries.

FIG. 2 is a schematic diagram illustrating a loop design cooker and associated apparatus of the invention adapted for the continuous enzymatic conversion of a starch slurry.

The embodiment illustrated in the schematic diagram of FIG. 1 is similar to the embodiment illustrated in FIG. 2. Consequently, the reference numerals employed in the description of FIG. 1 are also used for corresponding elements in FIG. 2, except that in FIG. 2, the numerals are primed.

Starch slurry 10 in holding tank 12 is agitated by conventional agitation means 14. Line 16 conveys slurry 10 from tank 12 to pump 18. Line 20 conveys pressurized slurry from pump 18 to jet 22. On-off slurry valve 24, slurry control valve 25, slurry rotameter 26, and slurry check valve 27 are positioned in line 20 between pump 18 and jet 22. Slurry return line 30 recycles or bypasses slurry from line 20 upstream of on-off slurry valve 24 to starch slurry tank 12. Pressure regulator relief valve 32 recycles slurry when slurry pressures in line 20 exceed a predetermined value. Steam supply line 35 is provided with trap 37, condensate drain 38. Supply lines 40, 41 provide steam supply to steam pressure regulators 43, 45, respectively. Reduced pressure steam supply line 47 conveys reduced pressure steam from regulator 43 through check valve 49 to jet 22. Steam flow measuring device 51 is optionally placed in line 47 upstream of check valve 49. "Excess" reduced, i.e., controlled, pressure steam line 53 conveys steam from pressure regulator 45 to inlet 55. Steam flow measuring device 57 and steam flow control valve 59 are located in line 53.

LOOP COOKER

In the embodiment illustrated in FIG. 1, loop cooker, indicated generally at 66, includes relatively large-diameter U-shaped portion 68 and relatively narrow-diameter line 70 which pneumatically connects upper portions 72, 74, of wide-diameter portion 68. Thus U-shaped member 68 and shunt line 70 form a continuous, open "loop." It is of substantial significance that the U-shaped portion 68 includes longer vertical leg 76 and shorter vertical leg 78 which are connected at the bottom by conduit 80. Jet 22 is positioned to discharge its steam-slurry mixture into upper portion 72 of elongated member 76. Line 70 connects to vertical member 76 near end plate 82, and it connects to vertical member 78 through end plate 84. Relatively wide-diameter sidearm 86 is positioned adjacent upper end portion 74 of shorter vertical member 78 and extends substantially horizontally therefrom, terminating at outlet 88 which is the common outlet for liquid and gas. Three-way valve 89 through which gas and liquid passes from cooker 66 to line 90 is a large bore ball valve or plug cock, and virtually no pressure drop occurs across it. Line 90, which provides the common conduit for effluent liquid and gas, conveys the liquid-gas mixture to pressure regulating valve (blow-down valve) 92, and through blow-down outlet 94 to steam-paste separator 96. Separator 96 can be a conventional cyclone type separator discharging steam overhead in line 98 and liquid effluent from below to line 100. Water dilution system 102 provides dilution and cooling of liquid in effluent line 100, or blow-down outlet 94 if desired. Optional clean-out and drain system, generally indicated 104, permits draining and cleaning of the equipment when the equipment is not in use. Cooker 66 is evacuated by setting valve 89 to permit no flow of gas through outlet 88, whereby gas pressure forces liquid through drain 104 into line 90.

CONTROL SYSTEM

Control air supply line 105 provides constant high pressure supply to manually adjustable pressure regulating valves 107, 109. Valve 107 is regulatable to provide pilot pressures (P) in lines 112 and 114. Line 112 connects the pilot outlet pressure air from valve 107 to pressure regulator valve 92. Line 114 connects to pressure regulators 109 and 32.

The control system will be described hereinafter by starting at the main supply line 105, the elements will be discussed as they occur in approximate sequence starting at supply line 105.

Valve 107 is a conventional regulator valve of known type which provides constant pressure in its outlet 112. Thus, for example, 50 pounds per square inch gauge pressure can be maintained in line 112 by adjustment of valve 107. Valve 92 is a pilot-actuated type valve which is not separately adjustable and permits flow from line 90 to line 94 when the pressure in line 90 exceeds the pilot pressure (P) in line 112.

Pressure regulating valve 107 also provides pilot pressure in line 114, and thence at pressure regulating (slurry relief) valve 32. Valve 32 is an additionally adjustable pilot actuatable valve of known type which permits passage of liquid through line 30 when the pressure in line 30 exceeds pilot pressure by an adjustable predetermined increment Thus valve 32 includes mechanical means of adjustment whereby pilot pressure of line 114 plus some predetermined pressure increment, set by mechanical adjustment, is maintained in line 30. Pilot pressure line 114 also provides reference pressure to adjustable pressure regulating valve 109. Valve 109 includes means of the known type for reducing the pressure of air from line 105 to a predetermined pressure value equal to pilot pressure plus a mechanically set additional incremental pressure. For example by proper adjustment of a mechanical element on valve 109 the pressure of the output of valve 109 can be adjusted to provide 15 pounds, for example, above pilot pressures, e.g., 65 pounds, when the pressure in line 112 is 50 pounds. The pressure-output of valve 109, i.e., the pressure in line 116, controls steam pressure regulating valves 43, and 45 which are substantially identical. Valves 43, 45 are of known type and pilot actuated which permits steam to pass through whenever the pressures on the outlet lines 47, 53, respectively, are less than the reference or pilot pressure in line 116, i.e., (P +increment).

HIGH TEMPERATURE OPERATION

Starch-water slurry 10 is preferably discharged by pump 18 at a rate substantially higher than that required at jet 22, so that pressure-regulating or relief valve 32 operates more or less continuously to recycle a substantial portion of slurry in line 20 to tank 12 as set forth above. Valve 32 is adjustable so that the pressure in line 20 is equal to pilot pressure (P) plus some predetermined increment, e.g., 15 PSI. Thus, with valve 24 open and control valve 25 properly adjusted to provide the predetermined feed rate as observed on slurry rotameter 26, slurry 10 is injected into loop cooker 66, through jet 22. Jet 22 can be any of the known type of devices for intimately mixing steam and liquid, and is preferably of the type illustrated in U.S. Pat. Nos. 3,805,966, 2,871,146, or 2,919,214. Such now conventional jets intimately and violently mix steam and liquids. The discharge mixture from jet 22 sprays downwardly through upper portions 72 of cooker 66. It is essential, in accordance with a preferred method of operation of this invention, excess steam is provided through jets 22. That is, a sufficient quantity of steam is intermixed with slurry 10 in jet 22 to both raise the temperature of the slurry to the predetermined level, and moreover, to provide a gaseous steam in excess of that amount. In upper portion 72 of relatively long member 76 great turbulence is developed in the gas phase as part of the steam and the liquid moves generally downwardly through the gas phase and some of the excess steam moves generally upwardly through it, thence from member 76 through line 70 to upper portion 74 of shorter member 78. Thus, in longer member 76, heated liquid phase material 122 is separated from excess steam, and the liquid phase material resides in the bottom portion of cooker 66. Until the liquid level 125 of side tube 86 reaches outlet 88, only excess steam can pass through line 90 to pressure regulator valve 92. When the pressure within cooker 66 reaches the predetermined pressure (P), valve 92 permits evacuation or "blow-down" from cooker 66. The high pressure differential between cooker 66 and separator 96 causes effluent exiting gas to move in violent expansion past valve 92. Moreover, the movement of gas through outlet 88 causes any liquid at that level to tend to be aspirated through line 90. Supply of excess steam is added through pressure regulator 45 at a fixed incremental pressure above pilot pressure and hence is added at a certain rate, depending on the setting of control 59. Material from cooker 66 passes through line 90 at whatever rate is required to maintain pressure within cooker 66 at approximately the pilot pressure plus whatever pressure differential is required to overcome the usual line 90, 94 restrictions. The movement of liquid 122 and steam through lines 90, valve 92 and line 94 into separator 96 tends to be quite rapid and when lines 90, 94 are relatively narrow, the resulting vigorous agitation and the violent action which results from the rapidly moving stream passing through the valve 92, provide extremely high level of shear. Ordinarily the pressure within separator 96 is atmospheric pressure and therefore the pressure differential between line 90 and line 94 is substantially pilot pressure (P). The amount of steam mixed with input jet 22, as observed at steam flow measuring system 51, is regulated by setting the pressure increment at valve 109. If desired, most of the excess steam can be injected through inlet 55. Thus, adjustment of control valve 59 provides additional steam at outlet arm 86.

Based on repeated observation, it is believed that one of the reasons for the outstandingly good performance of the cooker of this invention is the fact that the quantity of steam mixed initially in jet 22 can be that amount to virtually assure elevation of the temperature of incoming liquid to the required level and yet not provide a great deal of excess steam. It is believed that the passing of the dispersed incoming liquid through the high pressure gas phase in portion 72 prolongs the heat exchange function. It is also believed that copiously excess quantities of steam passing through inlet 55 eliminates the heretofore generally obtained massive intermixing of liquid 122 at various depths in detention chamber 68. It is believed that massive intermixing of liquid in retention chambers heretofore used was far more instrumental in developing a great variation in residence time from increment-to-increment than the spread of residence times generated by preferred embodiments of this invention in which frequent turns in the liquid flow channel minimize the parabolic velocity pattern associated with laminar flow. Introduction of most of excess steam at liquid surface 125 in sidearm 86 instead of with the incoming feed at jet 22 prevents agitation of relatively large quantities of liquid in liquid phase 122 in leg 76. Moreover addition of very large excess of gas through jet 22 tends to cause entrainment of liquid in the gas stream passing through bypass leg 70, and hence is, for that reason, not desirable.

In the numbered examples, herein, all weights are expressed in parts by weight, all percent values are by weight. The abbreviation d.s. means based on the weight of dispersed solids; Examples 1 and 2 illustrate the high temperature non-enzyme operation of the embodiment illustrated in FIG. 1.

EXAMPLE 1

A slurry prepared from bleached corn starch and water (25 percent dispersed solids) is prepared and charged to tank 12. In the embodiment of this example a U-shaped chamber having 5 inch inside diameter and 15 gallon liquid retention capacity was employed. In a first series of runs, all operating variables were maintained at a constant level from run to run, except that slurry feed rate was varied from run to run. The amount of steam added through jet 22 was slightly in excess of the amount required to raise the input slurry to operating temperature, and, in this first series of tests, no additional steam was added through inlet 55, i.e., control valve 59 was closed. The slight excess steam added through jet 22 bypassed the retention chamber by flowing through the one inch pipe portion 70 of the continuous loop and thus passed through sidearm 86 through common liquid-gas outlet 88. Thus slurry and steam are separated immediately upon entering into the cooker, and are rejoined prior to pressure release valve 92. The paste and steam are separated again in flash chamber 96. Pressure regulating valves 32, 43, 45, are preferably adjusted to provide pressures of the steam feed at least 10 pounds over the pressure in the reactor, and a slurry feed pressure at least 10 pounds over the steam feed pressure. The observations recorded during this series of runs are set forth under Series I in Table I below.

EXAMPLE 2

A second series of runs (Series II) similar to those of Example 1 were carried out under conditions such that, except for the first run of Series II, all the operating variables remained constant except chamber pressure, i.e., pressure in gas phase of the cooker 66. The observations recorded in connection with the second series are tabulated under Series II in Table I.

The chamber temperature, i.e., the temperature of the liquid 122 in loop 66 is dependent upon, and automatically varied with pressure. In this series of tests, in which the pressure in chamber 66 ranged from 18 PSIG to 80 PSIG in the separate respective tests, constant pressure differential (See Example 1) was maintained between slurry and chamber, and between steam supply and chamber, and this permitted constant feed rate of both slurry and steam, regardless of actual pressures utilized.

Run number 1, of Series II as indicated in Table 1, was made at a feed rate of 4 gallons per minute, whereas in runs 2 through 6, the feed rate was 5 gallons per minute.

Once the feed rate was adjusted by means of slurry control valve 25 in run number 2, it was not necessary to make further adjustments of feed rate in runs 3 through 6 to compensate for the changes in pressure in operating chamber 66. Likewise, steam input remained constant in spite of actual pressure changes due to the maintenance of constant pressure differential across steam feed constructions.

TABLE 1

[Viscosity reduction of starch in a 10 g.p.m. loop design jet cooker without excess steam]

| Series | Run No. | Slurry | | | Chamber | | Retention time, min. | Dudley visc. 14% d.s., 150° F (sec.) |
|---|---|---|---|---|---|---|---|---|
| | | Flow, g.p.m. | pH | Percent d.s. | Press., p.s.i.g. | Temp., °F. | | |
| I | 1 | 1.0 | 6.9 | 25.1 | 80 | 320 | 15 | 42.5 |
| | 2 | 3.0 | 6.9 | 25.1 | 80 | 320 | 7.5 | 43.5 |
| | 3 | 5.0 | 6.9 | 25.1 | 80 | 320 | 5 | 45.0 |
| | 4 | 6.0 | 6.9 | 25.1 | 80 | 320 | 2.50 | 45.5 |
| | 5 | 7.0 | 6.9 | 25.1 | 80 | 320 | 2.15 | 46.5 |
| | 6 | 9.0 | 6.9 | 25.1 | 80 | 320 | 1.70 | 49.5 |
| II | 1 | 4 | 6.7 | 25.8 | 80 | 315 | 3.8 | 47 |
| | 2 | 5 | 6.7 | 25.8 | 62 | 300 | 3 | 50 |
| | 3 | 5 | 6.7 | 25.8 | 47 | 285 | 3 | 58 |
| | 4 | 5 | 6.7 | 25.8 | 33 | 265 | 3 | 75 |
| | 5 | 5 | 6.7 | 25.8 | 24.0 | 255 | 3 | 120 |
| | 6 | 5 | 6.7 | 25.8 | 18 | 240 | 3 | 200 |

Paste pH =6.4
Fluidity of starch used for Series I runs, 88 m.l(2½ gm.)

LOOP COOKER FOR TWO-STAGE OPERATION

The embodiment illustrated in the schematic diagram (FIG. 2) is particularly well suited for low temperature enzymatic hydrolysis of starch slurries followed by short heat treatment at high temperature to deactivate the enzyme. Many of the elements illustrated in FIG. 2 are designated by numerals which are primed. These elements are similar to the elements described in connection with the embodiment illustrated in FIG. 1 and consequently the description of these elements will not be repeated at this point.

The loop cooker, generally 66', is identical in principle to the loop cooker 66 described in FIG. 1, even though at first glance, loop cooker 66' appears to be quite different. The illustration of the embodiment utilizing the superficially dissimilar shape is provided in order to better point up the essential characteristics and nature of the loop cooker of this invention.

The embodiment illustrated in FIG. 2 will be described in detail hereinafter with respect to those elements which differ substantially from those employed in FIG. 1.

Pressure regulator 32' may be controlled by means of an air pilot system as described in connection with FIG. 1 or it may be of the type which is manually regulated. In the embodiment illustrated in FIG. 2 enzyme additive is added to feed line 20' downstream of check valve 27'. Hence the apparatus of FIG. 2 includes enzyme feed tank 125, enzyme conduit 127, enzyme metering pump 129 and enzyme check valve 131.

Air from high pressure air line 133 is controlled by pressure regulator valve 135 of known type and optionally, pilot actuated, which is set to deliver air to line 70 through line 137 at predetermined incremental pressure above pressure in the reactor 66, e.g., 10 PSI above reactor pressure. Flow regulating valve 138 controls amount of air flowing into the system. Thus air valve 135 can be controlled by air pressure in line 116 (See FIG. 1) in the same manner as steam pressure regulator 43'. The quantity of steam which is required to heat the slurry to the optimum temperature for enzymatic hydrolysis of the slurry is well below that amount which will provide excess gaseous steam. Therefore, in order to develop phase separation and maintain the presence of constant volumes of both liquid and gas phase materials within the cooker of this invention, a gas (a material which is not condensable under operating conditions), e.g., air, is necessary. The slurry-steam mixture leaving jet 22' is discharged into separator 139. In separator 139, liquid phase material drops by gravity through upwardly disposed leg 76'. Any gas phase material leaves separator 139 through open line 70' which pneumatically connects separator 139 with upper portion 74' of leg 78' of detention chamber 66'. Thus in the embodiment illustrated in FIG. 2, during initial operation of the cooker illustrated in FIG. 2, the liquid phase material collects in the lower portion, i.e., that portion below line 125' which is on a level with discharge outlet 88', and only air is vented through outlet 88' and the level of liquid continues to rise, i.e., portion 80' and leg 78' are filled to maximum capacity. The increase in volume of liquid phase material to a level above line 125' is prevented as a consequence of continuous aspiration of liquid through outlet 88' by compressed gas in the head space, i.e., the space within leg 76', 70' and chamber 74' above the level 125'. Optional pressure regulator 92' permits discharge of gas, or gas-liquid mixture when pressure within cooker 66' exceeds a predetermined pressure. Thus, optional regulator 92' may be controlled as in the embodiment illustrated in FIG. 1 by pilot air pressure, e.g., through line 112. The actual level of liquid 122' in leg 76' will be slightly higher than horizontal line 125' during continuous high through-put operation, the difference in height being dependent primarily on rate of through put and viscosity.

Steam from line 41', controlled by pressure regulator 45' is supplied through line 53', through check valve 141 to second jet 144. Gas-liquid mixture discharging from optional regulator 92' is conveyed through line 146 to a mixer 144, which can be a cam pressure drop jet, where it is intimately mixed with steam. The discharge from jet 144 is received by detention chamber 148 which is substantially identical to detention chamber 66 described in FIG. 1. Hence liquid phase material collects in the U-shaped lower portion until the liquid line reaches the level of outlet line 150, and gas phase material passes through upper portion of the continuous loop, e.g., through bypass line 152. A mixture of liquid phase and gas phase material is continuously discharged from detention chamber 148 when the pressure of detention chamber 148 exceeds a predetermined pressure, and this discharge is controlled by regulating valve 154 which may be connected to, and controlled by, air pressure pilot systems described hereinbefore, except that the flow through regulators 154 must take place when the pressure within chamber 148 exceeds a pressure level which is a substantial increment below the operating pressure of chamber 66. For example, when valve 92' is set to discharge material from chamber 66, at a pressure of 50 pounds, valve 154 can be set to discharge material from chamber 148 at a pressure of 35 pounds. In the two-stage enzymatic hydrolysis, sufficient steam is added at jet 144 to elevate the temperature of liquid retained in chamber 148 to a temperature level sufficient to de-activate enzymes, e.g., 250°-320° F. Chamber 148 can be substantially smaller than chamber 66' since the retention time in chamber 148 is relatively short, e.g., 60 seconds.

The "S" shape of conduit 78', 80' is provided to develop flow characteristics closely approximating that of "slug" flow.

In spite of the possibly erratic variation of the liquid-gas interface at level 125' in leg 76', liquid 122' entering conduit 80' causes virtually no mixing of liquid 122' therein. As liquid 122' passes through conduit 80' and upwardly through conduit 78' in the S pattern, minimal intermixing occurs. Hence, the particular configuration of the continuous closed loop is not restricted to a U, or V, or S in accordance with this invention. Any configuration or baffling which minimizes intermixing of liquid 122 in the course of its travel through retention chamber 66' may be, and preferably is, employed. For example, a spiral-shaped conduit 78 is contemplated for use in accordance with this invention. The continuous open loop, having an upper gas passageway, and lower liquid passageway, with the passageways ending at the level of the common gas-liquid outlet, with the liquid inlet on one side of the loop, and the outlet on the other side of the passageway is at the essence of this invention. Means for continuously adding liquid, and gas, and means for discharging the loop when a predetermined operating pressure is achieved is also essential. As explained hereinbefore one of the serious shortcomings inherent in apparatus suggested prior to this invention has been the tendency to contaminate freshly charged liquid phase material with other liquid material which is in an advanced stage of hydrolysis. This problem can be resolved with the use of the apparatus of this invention. Hence, one of the beneficial effects of the apparatus of this invention is the result that an extremely high percentage of the liquid processed therein is heat-treated for a period of time which is the "average" detention time, thus making for an extremely uniform product. Because of the extreme simplicity of the apparatus of this invention, commercial-size units, i.e., 10 gallon per minute capacity, can be mounted on a relatively small platform and the resulting portable unit is readily moved about by a forklift.

The degree of precision with which liquid level 125, 125' is maintained constant in accordance with this invention depends in part on the configuration of discharge port 88, 88'. To design for greater control, the vertical dimension of port 88, 88' is decreased. For example, a narrow horizontal slit permits evel less variation in liquid level than a round opening of the same cross sectional area. The invention is not limited to a particular configuration of port 88, 88'. One with ordinary skill in the art can determine the desired volume of retained liquid and position discharge port 88, 88' at the corresponding level. Regardless of configuration of outlet 88 there is acceptable control of variation of liquid level 125, e.g., in a 5-6 foot depth of liquid bed controlled to within one-fourth inch by orifice provided in commercial regulator valve 92. It will be appreciated that the aforedescribed apparatus and method is readily adaptable to completely automatic startup and shutdown, for example, in response to a liquid level sensor in the tank into which the cooker product is discharged. In such embodiments, valve 92 is adjustable by the operator and is the only setting the operator need adjust in order to adjust the quality, e.g., viscosity of the product.

What is claimed as novel is:

1. In an apparatus for thermally modifying starch suspended in an aqueous starch slurry which includes means for feeding starch slurry feed under a controlled pressure, means for feeding steam feed under controlled pressure, jet mixer means for intimately mixing said slurry feed and steam feed at said slurry feed and steam feed pressures to provide a steam-slurry stream discharging from said mixer, and detention chamber means for receiving said steam-slurry discharge stream, the improvement in which:

said detention chamber means comprises a continuous loop chamber having connecting upper and lower passageways, said passageways merging at a horizontal plane, respective portions of each of said passageways being positioned on opposite sides of a vertical plane through said loop;

said chamber having discharge port means including a discharge port positioned at said horizontal plane between said upper and lower passageways, said discharge port being positioned at said chamber on one side of said loop;

means for conveying said steam-slurry discharge stream to said detention chamber and discharging said steam-slurry stream into said chamber on the other side of said loop;

means for continuously injecting gas phase material into said upper passageway, whereby the contents of the detention chamber include a liquid and a gas phase, and whereby a liquid-gas interface occurs at said horizontal plane at the level of the discharge port means, and recombined gas-liquid effluent is discharged through said discharge port means; and blow-down regulating means for controlling the rate of flow of recombined gas-liquid effluent from the detention chamber and for maintaining a predetermined operating pressure within said chamber.

2. The apparatus of claim 1 in which said blow-down regulating means are responsive to the deviation of the pressure within the detention chamber from a predetermined level, and in which the apparatus includes means for automatically maintaining the slurry feed pressure and the steam feed pressure at a fixed predetermined increment above said detention chamber pressure.

3. In an apparatus for modifying the physical and chemical characteristics of starch suspended in an aqueous starch slurry which include means for feeding said starch slurry feed under a controlled pressure, means for feeding steam feed under controlled pressure, jet mixer means for intimately mixing said slurry feed and said steam feed at said feed pressures to provide a steam-slurry stream discharging from said mixer, and detention chamber means for receiving said steam-slurry discharge stream, the improvement in which:

said detention chamber means comprises a U-shaped chamber having an upstream and downstream leg, said legs being joined by a passageway at a base portion thereof, said chamber being positioned with the upstream and downstream leg extending upwardly from said base portion of the U;

means for discharging said steam-feed slurry near the top of one of said legs;

open gas conduit means pneumatically connecting an upper portion of said legs;

said chamber includes discharge means including discharge port for discharging liquid and gas from the other of said legs wherein gas phase material remains above the level of the discharge port, and liquid phase material remains below the level of the discharge port;

said discharge port being positioned on said downstream leg at a level substantially below the top of the leg, and substantially below the point at which said gas conduit means enters each of said legs;

and the apparatus includes means for continuously injecting non-condensable gas into said chamber into said gas phase material; and, blow-down means for regulating pressure in the detention chamber, said blow-down means being downstream of said port.

4. The apparatus of claim 3 in which said blow-down means are responsive to the deviation of pressure within the detention chamber from a predetermined level, and in which said slurry feed pressure and said steam pressure are regulated by means which also control detention chamber pressure to maintain said slurry and steam feed pressure automatically at a fixed predetermined increment above said detention chamber pressure.

5. An apparatus for modifying the physical and chemical characteristics of starch suspended in an aqueous starch slurry comprising:

means for feeding starch slurry feed under a controlled pressure;

means for feeding steam feed under controlled pressure;

jet mixer means for intimately mixing said slurry feed and steam feed at said feed pressures to provide a steam-slurry feed discharging from said mixer;

detention chamber means for receiving said steam-slurry feed stream, said detention chamber means comprising a continuous closed loop chamber having upper and lower passageways having respective portions of said passageways positioned on opposite sides of a vertical plane through said loop;

said chamber having a discharge port means including a discharge port positioned between said upper and lower legs, said discharge port means including a laterally extending exit-chamber having a cross section approximately equal to that of the lower passageway, said discharge port being positioned at one side of said loop;

means for conveying said steam-slurry discharge stream to said detention chamber and for discharging said stream into said chamber on the other side of said loop;

gas injection means for continuously injecting gas phase material into the upper passageway, within said laterally extending chamber;

whereby the contents of the detention chamber include a liquid and gas phase and whereby a liquid-gas interface occurs approximately at the level of the discharge port means, said liquid level extending through said exit-chamber and occurring at a level substantially below the level of said gas injection means and below the level at which steam-slurry feed enters said chamber;

and blow-down means for regulating the rate of flow from said detention chamber through said discharge port.

6. The apparatus of claim 5 in which said blow-down means are responsive to the deviation of the pressure within the detention chamber from a predetermined level, and in which said slurry feed pressure and said steam feed pressure are regulated by means for controlling said detention chamber pressure and by which said slurry and steam feed pressures are automatically maintained at a fixed predetermined increment above said detention chamber pressure.

7. In an apparatus for modifying the physical and chemical characteristics of starch suspended in an aqueous starch slurry at an elevated temperature and pressure, which apparatus includes means for feeding said starch slurry feed under a controlled pressure, means for feeding steam feed under controlled pressure, jet mixer means for intimately mixing said slurry feed and said steam feed at said feed pressures to provide a steam-slurry stream discharging from said jet mixer, and detention chamber means for receiving and holding said steam-slurry discharge stream, the improvement in which:

said detention chamber means comprises a generally upright continuous loop having a discharge port communicating with one side of the loop at a level below the top of the loop;

means for discharging said steam-slurry stream into the other side of the loop at a level above the level of said discharge port;

whereby the level of said discharge port defines a constant liquid operating level, the space within the loop above the liquid level being head space; and, means for continuously injecting a gas which is not condensed at said elevated temperatures and pressure into said head space;

said discharge port being the only exit through which said gas and liquid can leave the continuous loop during operation thereof.

8. In a method of continuously converting starch which involves the steps of (a) projecting a pressurized slurry of raw starch, (b) impacting said slurry with an excess of pressurized steam for substantially instantaneous thermal disintegration of suspended starch particles within said slurry to gelatinize the starch slurry to a paste, (c) converting said paste at an elevated pressure and temperature, (d) retaining the partially converted starch paste for an additional interval of conversion, and (e) removing the converted starch product, the improvement comprising the steps of separating the starch paste from its gaseous and vapor phase after step (b) above, and passing the separated starch paste through a downward leg and an upward leg of a conduit, there being a free liquid phase surface of the paste at the upward leg, passing the separated gaseous and vapor phase to said liquid surface, and withdrawing separated gaseous and vapor phase material and paste at said upper surface through a common discharge port thereby controlling retention time and degree of conversion.

9. In a method of continuously converting raw starch which involves the steps of (a) heating a pressurized starch-water mixture, (b) retaining the mixture at an elevated pressure and temperature for a period of time until the starch mixture has been changed to a paste, and until the resulting paste achieves a desired degree of conversion, the improvement wherein starch-water mixture is retained in a container having an upper and lower region, said container having a discharge port between said upper and lower regions, said lower region comprising conduit means for passing said mixture to said discharge port with minimal intermixing of the mixture therein, injecting gas into said upper region, and withdrawing gas and starch paste through said discharge port, wherein the retained volume of said mixture in the container is automatically precisely controlled, and consequently the retention time and degree of conversion are controlled automatically by controlling feed rates, temperature, and concentration of any starch converting agents.

* * * * *

UNITED STATES PATENT OFFICE
CERTIFICATE OF CORRECTION

Patent No. 3,661,640                     Dated May 9, 1972

Inventor(s) Gene M. Griffith and Lester P. Hayes

It is certified that error appears in the above-identified patent and that said Letters Patent are hereby corrected as shown below:

Column 1, line 36, --(-- should be between "temperature" and "i.e.".

Column 4, line 62, --.-- should be between "increment" and "Thus".

Column 8, line 71, "320°F" should be --370°F--.

Column 12, line 8, "temperatures" should be --temperature--.

Signed and sealed this 10th day of October 1972.

(SEAL)
Attest:

EDWARD M. FLETCHER, JR.            ROBERT GOTTSCHALK
Attesting Officer                  Commissioner of Patents